United States Patent
Chandross et al.

[15] 3,668,663
[45] June 6, 1972

[54] OPTICAL STORAGE DEVICES

[72] Inventors: Edwin Arthur Chandross, Murray Hill; Richard Lynn Fork, Holmdel; Angelo Anthony Lamola, Warren; Walter John Tomlinson, III, Holmdel, all of N.J.

[73] Assignee: Bell Telephone Laboratories, Incorporated, Murray Hill, N.J.

[22] Filed: Nov. 24, 1970

[21] Appl. No.: 92,430

[52] U.S. Cl. ............340/173 LS, 340/173 CC, 340/173 CH, 350/160, 350/160 P
[51] Int. Cl. ...................................G11c 11/42, G11c 13/04
[58] Field of Search .................350/160, 160 P; 340/173 CC, 340/173 CH, 173 LS

[56] References Cited

UNITED STATES PATENTS 3,568,167  3/1971  Carson ...........................340/173 CC

*Primary Examiner*—Terrell W. Fears
*Attorney*—R. J. Guenther and Edwin B. Cave

[57] ABSTRACT

A new class of optical, switching and memory devices is based on the different refractive indices associated with each of the two states of the reversible photochemical interconversion between dimer and monomer states in a broad class of organic materials. Reversibility is expedited by use of a rigid medium. The active material may be a solution or suspension of the photosensitive species in a transparent matrix or may be a single-crystal form of the photosensitive material itself.

The particular chemical systems upon which operation is based are so chosen as to result in a relatively large spacing between absorption peaks associated with each of the two states. This class, in which change of state results in a significant change in the resonant character of the material, is further characterized by strong absorption bands (resulting in reasonably complete reaction), by ready reversibility, by thermal stability in either state at usual ambient temperatures, and by refractive index changes within the visible spectrum which are of sufficient magnitude for holographic and other switching or memory use.

14 Claims, 6 Drawing Figures

PATENTED JUN 6 1972 3,668,663

INVENTORS
E.A. CHANDROSS
R.L. FORK
A.A. LAMOLA
W.J. TOMLINSON, III

BY George S. Indig
ATTORNEY

PATENTED JUN 6 1972 3,668,663

OPTICAL STORAGE DEVICES

BACKGROUND OF THE INVENTION

1. Field of the Invention

The invention is concerned with materials suitable for use in switches and memories operating in the visible and near-visible spectra of electromagnetic radiation and to devices utilizing such materials. Included devices may process either digital information (digital light deflectors, etc.) or analog information (holograms, etc.).

2. Description of the Prior Art

Probably due to the impetus brought about by the development of the laser, the last several years have seen a large research and development effort directed to the development of elements operating in the visible and near-visible spectrum of electromagnetic radiation. Optical communication systems and storage and retrieval systems based on existing circuit elements are already a practical reality from a limited standpoint. While experience teaches us to expect any art to advance to greater and greater heights of sophistication, many optical circuit elements are already capable of operation at such low power levels and over such broad bandwidth as to make presently realizable optical systems competitive with more conventional lower frequency systems. An area in which improvement may be expected is in recording and switching media. Planned systems contemplate storage and retrieval of vast amounts of information both in permanent and semi-permanent form. One form that such storage may take is that of the hologram which depends upon constructive and destructive interference between coherent beams of electromagnetic radiation impinging on a medium. Beams may be spatially modulated as by passage through a data mask or by deflection from an object to be recorded, or may be unmodulated so as to produce a simple diffraction grating. Simple illumination of the recording, usually by a single coherent beam, results in diffraction of the light to form an image of the data array or object.

Many holographic media have been considered. Some depend upon an induced change in absorption at a viewing wavelength and others depend upon a change in refractive index. An example of the former is the simple photographic emulsion while the latter may be illustrated by gels, portions of which are either removed or altered by a chemical process as, for example, crosslinking. See Vol. 3, No. 7, *IEEE Spectrum*, pp. 67–74 (July 1966) and Vol. 6, No. 11, *Microwaves*, pp. 68–73 (November 1967). As indicated in the last reference, holographic media depending on refractive index change (producing "phase holograms") show a large advantage in efficiency over those depending on absorption. In fact, under certain circumstances, maximum theoretical efficiency is 100 percent for refractive index holograms and considerably less than 10 percent for absorption holograms.

In general, holographic media now under consideration are irreversible. In general, the interference pattern recorded owes its presence to a simple chemical reduction, to a stable crosslinking, or to actual material removal. Recently, some attention has, however, been directed to a class of photochromic materials known as "liquid crystals." Species of these highly complex organic materials may be caused to undergo color changes corresponding with a change in temperature which may, in turn, be produced by impinging light. Such photochromic media are considered particularly attractive since both storage and retrieval may be accomplished by means of light. Recognized disadvantages arise from the difficulty of maintaining the media in either state without the constant expenditure of energy and also from chemical instability. Where such media have been considered for information storage, reliance has generally been on absorption of the interrogating light beam.

SUMMARY OF THE INVENTION

A class of organic materials is found to exhibit required stability coupled with necessary device properties to permit their incorporation in light switches and memories operating at frequencies within the visible and near-visible spectra. The bistable states are associated with the dimer and monomer (or "broken dimer") photodimers. For the purpose of this description, when the dimer is photolytically converted to two monomer units which are maintained in the proper geometry for reconversion to dimer, the species consisting of such a pair of monomers is called "broken dimer." When maintained in a rigid form either as a single crystal or within a transparent matrix, the change in form between broken dimer and dimer is readily reversible and the reaction may be caused to proceed in either direction by light of a wavelength characteristically associated with one state or the other.

The structure and/or absorption spectra differences introduced by change in state result in associated changes in refractive index for light or broad bandwidth (relative to that required to produce the change in state). In consequence, information retrieval may be accomplished with light outside the region of absorption and thus may be nondestructive. Due to the separation in absorption peaks for the two states, both writing and erasing may be accomplished either locally or in bulk by use of light. Required intensities and wavelengths are available from commercial light sources. Both the dimer and broken dimer states are chemically and physically stable under most environmental conditions and either can be retained without noticeable deterioration for periods of many months and more.

Many types of molecules may undergo dimerized and, in more than one class, such changes of state may be photoinduced. The invention is, however, critically dependent on the choice of systems which yield appropriate changes in refractive index upon undergoing the change in state. The appropriate class is set forth in detail in the description. Briefly, the invention is dependent upon a chemical system in which photodimerization involves two carbons which occupy para positions in an aromatic ring. It is further required that these carbons occupy positions other than those at points of ring fusion. Appropriate monomer structures may contain but a single aromatic ring or may contain fused structures including from two to six rings.

The large change in refractive index which is responsible for the device interest in this class of compounds is, in part, associated with the strong absorption bands at the levels at which the change of state in either direction may be photoinduced. This is, in turn, due to the resonant nature of the molecules themselves. The large change in index is also associated with the relatively large separation between the absorption bands. This separation is due to the change in nature of the molecule as between the two states. The moiety containing the two carbons which are functional in the dimerization is itself resonant in the monomer (or broken dimer) state. In the dimer state, resonance is destroyed. Where the monomer is a single ring structure, this may destroy all resonance. Where it is a fused ring structure, residual resonance is that of a significantly smaller electronic system (for example, in the instance of anthracene derivatives dimerization ordinarily occurs in the center ring so that the size of the residual resonant system is reduced to about one-third).

Since the change in state is associated with individual molecules, resolution is, in the usual case, dependent not on the medium but on the activating means. Present laser sources are capable of resolutions of the order of 0.3 micrometers. Available matrix materials are sufficiently transparent over usable bandwidth to introduce insertion losses as low as 10 percent. Single crystals of the active materials themselves also evidence low loss at wavelengths spaced from the absorptions associated with the two states.

Refractive index holography, other analog uses, and also digital uses are suggested. The invention contemplates a broad class of memory and switching elements utilizing the described materials.

DETAILED DESCRIPTION

1. The Compositions

Figure 1:
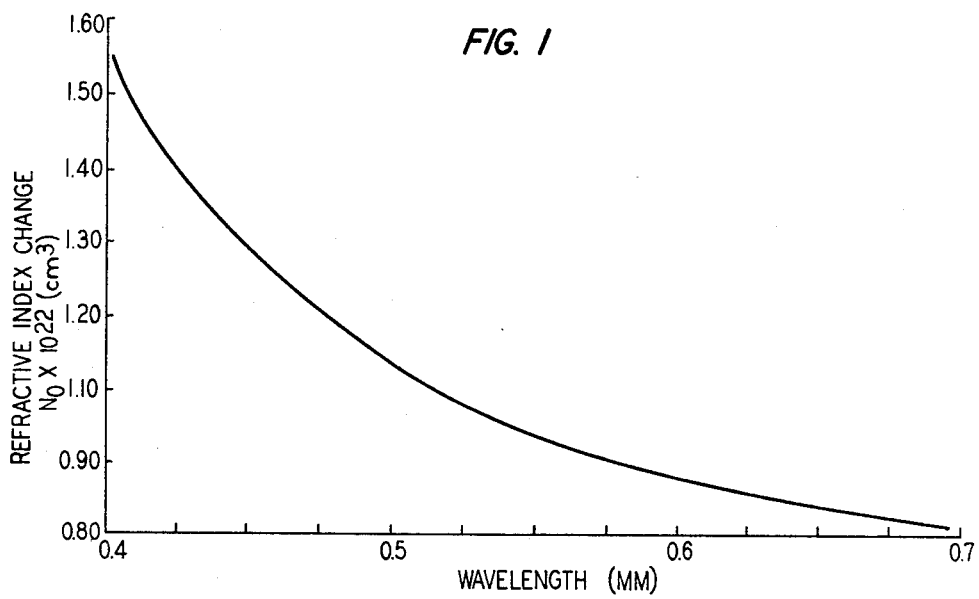
FIG. 1, on coordinates of refractive index change and wavelength in micrometers, is a plot showing the relationship between the recited parameters for a characteristic photodimer-broken dimer system.

It has been indicated that composition choice is critical. While there are many molecules which may be cause to reversibly undergo photodimerization, dependence on the refractive index change at frequencies significantly removed from the absorptions associated with the change of state put special requirements on composition choice. For the purposes of this invention, compounds are necessarily chosen from that class in which dimerization involves parapositioned carbons of aromatic moieties. Where the aromatic system involves fused rings, it is further required that these carbons not be at fusion points.

Success realized by choice of a material within this class is dependent upon a number of factors:

1. The fact that the monomer, and sometimes the dimer, is resonant results in strong absorption bands which, in turn, result in relatively large scale changes in refractive index at frequencies with invisible spectrum sufficiently separated from these absorption bands as to avoid unwanted photoinduced change in state.
2. The drastic change in the size of the resonant electronic system resulting from dimerization (for a single ring monomer resonance may be destroyed in its entirety) results in a large spacing between absorption bands. This results in two desirable characteristics (a) relatively complete reaction between states so that the "dimer state" contains a minimal amount of broken dimer and vice versa, and (b) the change in refractive index attendant on the separation and absorption bands is large (typical change in index at usable frequencies within the visible are generally in excess of the 0.1 percent considered adequate for most holographic work-changes an order of magnitude greater are not uncommon).
3. Both states are inherently stable under usually encountered environmental conditions generally at temperatures well in excess of room temperature.

It is a requirement of the invention that the monomeric or "broken dimers" be maintained in approximately the same physical juxtaposition as in the dimer state. This is generally accomplished by using a single crystal of the dimer system itself or by dissolving or suspending the dimerized material ("normal" state) in a matrix material which manifests the requisite rigidity and transparency over the required operating temperature range. Suitable matrix materials are varied and include polymethacrylate and silicon resins.

Where cycling between the two stable states is contemplated, it is, of course, required that the transparency bandwidth of the matrix include both activating wavelengths (the longer wavelength required to dimerize and the relatively shorter wavelength required to break dimers). The matrix should, of course, also be transparent at the wavelength or over the band of concern for interrogation. For the non-destructive mode of operation of the invention, the interrogating wavelength is different from either of the activating wavelengths. The single crystal form of the active material necessarily fulfills the first requirement, i.e., is inherently transparent to the two converting wavelengths (except for the absorption responsible for making and breaking dimers). It also inherently maintains the broken dimers in the same approximate positions they occupy in the dimerized state.

The required class of materials includes the photodimers of aromatic monomers containing single or up to six fused six-membered rings. (The maximum is premised in the reactivity of larger molecules.) Such materials may be pure hydrocarbons, such as alkylated anthracenes and higher homologs; may include a variety of substituents which may or may not be hydrocarbons; and may include elements other than carbon, e.g., nitrogen in the rings. The class includes, inter alia, various esters of anthroic acid and of higher acids within the class. Dimers of this class are observed to form complex ring structures in which bonding takes place between unfused para members of intermediate rings, for example, dimers of anthracene derivatives are generally bonded through the elements at the 9 and 10 positions. Examples of compounds falling within the preferred class, all expressed in terms of the monomer, are set forth:

2-aminopyridine hydrochloride and closely related substances (e.g., with methyl groups)
2-pyridone
anthracene
amyl-9-anthroate
methyl-1-anthroate
methoxy benzphenazine
tetracene
acridizinium p-toluenesulfonate Particularly for certain of the fused structures, dimerization may proceed with different carbon pairs; that is, while it is a requirement that the involved carbons be members of a single ring moiety, this and further requirements may be met by dimerization involving either a para-positioned pair of an end ring or the available unfused para-positioned carbons of any intermediate ring. Similarly, where substituent nature or other considerations are not such as to produce a strong reference for a particular pair of carbons, the resulting dimer may be asymmetrical, i.e., may involve bonding between dissimilar carbon pairs of each monomer unit. It follows that in certain cases the entire state may actually involve two or more stereoisomers. The general requirement is only that change of state be sufficiently complete to result in a device-significant change in composition at equilibrium for the two states. It is inherent that reaction is sufficiently complete for any member of the designated class of compounds. For any such material, it is always possible to choose a wavelength at which the refractive index change is at least the required 0.1 percent.

In general, the active (dimerized) material is incorporated in a sufficiently transparent and stable matrix, such as a cured methacrylate-base resin, by molding or as a cast film. One preparatory technique involves the conventional bulk polymerization of a mixture of the matrix monomer and the dimer. Resins may or may not be crosslinked. Incorporation of the photodimer in films of polymers having poor solvent qualities may be accomplished by using a separate solvent. Samples have also been prepared by simple freezing of a fluid mixture. Unfortunately, many otherwise simple matrix materials appropriate to this preparatory technique have freezing points below room temperature.

Concentration levels of dimers (where inert matrices are used), as well as dimensions and geometries, are engineering considerations. Generally, there is no objection to operating at or near saturation, of course, while providing sufficient margin to avoid precipitation at any normally encountered temperature. The other parameter of primary importance is thickness in the reading direction.

For an efficient hologram, the thickness of the material should be of the order of the wavelength of the interrogating radiation divided by the difference of the refractive indices for the material in the two states. For dilute solutions, thicknesses of the order of millimeters are suggested, while for single crystals, thicknesses as for micrometers may be sufficient. As described above, such a thin hologram in a crystal could be written in a thin layer on the surface of the crystal with the remainder of the crystal serving as an inert substrate.

2. The Figures

The data plotted on FIG. 1 relates the change in refractive index in units of refractive index relative to vacuum, $n_o \times 10^{22}$ cm² with wavelength in micrometers, $\mu$m for the photodimer-broken dimer system based on anthracene. The curve form and the order of magnitude index change are characteristic for all included chemical systems.

Figure 2:
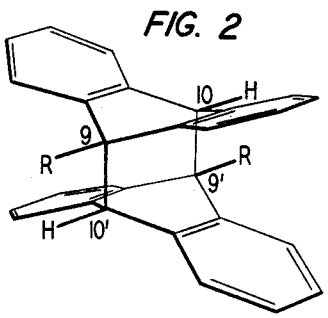
FIG. 2 is a diagrammatic view showing the probable structural configuration of a member of the class of photodimers in accordance with the invention.

FIG. 2 depicts the average structure of a dimer of an anthracene derivative such as that for which the data is plotted in FIG. 1. It is seen from this figure that bonding occurs between the 9 and 10 positions (or more generally para positions) of carbons of an aromatic moiety. This is intended to be a generalized structural formula showing the approximate average positions of the atoms. The "R" substituents are representative of hydrocarbon or nonhydrocarbon substituents. Additional substituents may also be present, and while dimerization must involve resonant moieties, additional ring structures may be resonant or not and hydrocarbon or heterocyclic. This figure is illustrative of the class of compositions herein. Photodimers of higher order homologs are similarly bonded through unfused parapositioned atoms. While such dimers ordinarily include two atoms within a single ring of a given monomer unit, bonding may involve a noncorresponding ring of the other monomer unit. Such variants include but are not limited to stereo-isomers.

Figure 3:
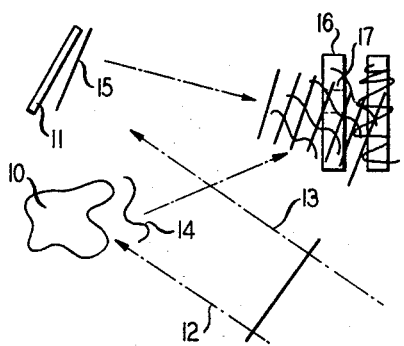
FIG. 3 is a diagrammatic view of a system arranged for hologram formation on a medium in accordance with the invention.

FIG. 3 depicts one type of holographic apparatus considered representative of an analog memory in accordance with the invention. In the mode shown, object 10 and plane mirror 11 are illuminated by parallel laser light beams 12 and 13 resulting in reflected fronts 14 and 15 which impinge on photodimer medium 16 so positioned as to be in a region in which fronts 14 and 15 interfere. Constructive interference is, for the simplified case, shown produced at regions 17. Assuming medium 16 to be in the normal or dimer state and light beams 12 and 13 to be of such wavelength as to approximately correspond with the appropriate absorption for the normal state, preferential breakdown of the dimer state is produced at regions 17. Recording may be similarly achieved by utilizing a medium in the broken dimer state and by illuminating with light of a wavelength corresponding with the appropriate absorption to produce photodimerization.

Reconstruction is accomplished in the known manner usually with coherent light. A detailed description is contained in Vol. 3, No. 3, *IEEE Spectrum*, pp. 67–74 (July 1966).

Characteristically, dimerization proceeds at wavelengths of electromagnetic radiation longer than those required for dimer breakdown. The reverse reaction for many of the materials studied requires wavelengths well into the ultraviolet but generally at wavelengths in excess of 2,300 A. Suitable light sources include mercury, mercury zenon arc lamps, cadmium-ion lasers, as well as harmonics of lower frequency laser such as argon ion lasers. Dimerization for the materials studied ordinarily occurs at a wavelength of over the range of from 3,000 to 7,000 A. For such materials, interrogation may be carried out nondestructively at any desired wavelength within the visible spectrum assuming there is sufficient transparency and, of course, providing there is sufficient separation from a wavelength which causes redimerization.

Figure 4:
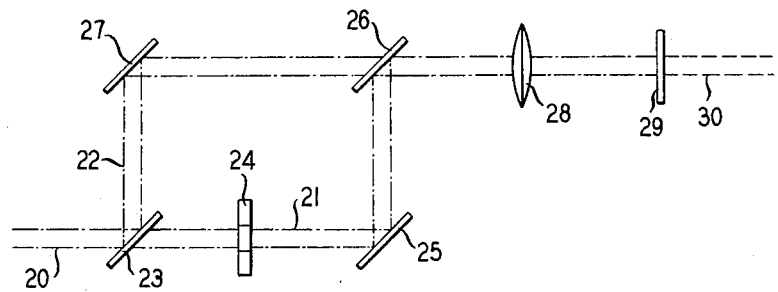
FIG. 4 is a diagrammatic view of a digital device utilizing a material of the invention.
Figure 5A:
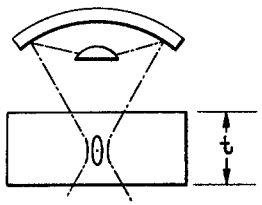
FIGS. 5A and 5B are schematic elevation and perspective views, respectively, of apparatus for producing a light guide and light guide so produced.
Figure 5B:
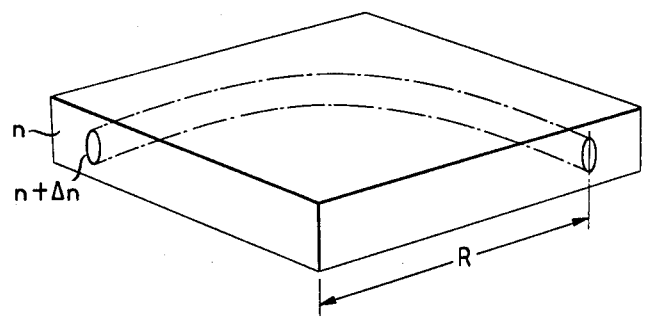

FIG. 4 shows a simple digital apparatus utilizing a material of the invention. The configuration is first described in terms of the readout mode. A light beam 20 is split into two beams, 21 and 22, by means of prism 23. Beam 21 passes through storage element 24. This element 24, which is constructed of a material herein, is predominantly of one state, for example, the dimerized state, with information being stored in the form of small positioned areas of the other state (for example, the broken dimer state). The wavelength front of beam 21 is distorted by the refractive index inhomogeneities representing stored information. The beam is deflected by mirror 25 and a reflecting surface of prism 26. Beam 22 is reflected by a partially reflecting surface of prism 23 and, again, by mirror 27 so as finally to pass through prism 26 and interfere with beam 21 at that position. The composite beam is finally focused by lens 28 onto screen 29. The image on screen 29 is an amplitude replica of the reflected index pattern of storage element 24.

Writing may be accomplished simply by treating element 29 as a data mask which transmits only portions of beam 39 shown in phantom. This beam may be focused by lens 28 and reflected by elements 26 and 25 so as finally to preferentially illuminate portions of storage element 24. Writing is accomplished by use of a wavelength within the absorption band resulting in photoinduced change in state while reading is accomplished with a relatively long wavelength sufficiently separated from any such absorption band as to produce any reaction.

3. Examples

The following examples describe experiments conducted on included dimer materials. They were selected to show both the change in composition (Examples 1 and 2 relate to different single crystal combinations) and also a comparison between single crystal and matrix-containing compositions (Examples 2 and 3 relate to the same photodimer system which is in single crystal form in Example 2 and contained any matrix in Example 3).

EXAMPLE 1

A single crystal of a photodimer of 2-aminopyridine was prepared by irradiation of a solution of 2-aminopyridine in concentrated hydrochloric acid. The hydrochloride salt of the dimer was converted to the phosphate salt by treatment with excess aqueous potassium dihydrogen phosphate. The precipitated phosphate salt of the dimer was dissolved in water containing some phosphoric acid and crystals were grown by slow evaporation in the range 50°–25° C.

A crystal approximately $4 \times 4 \times 2$ mm was selected, and the two large faces polished optically flat.

Using an Xe-Hg arc lamp, and a grating monochromator to isolate the 0.248 $\mu$m spectral line, the crystal was irradiated for several minutes with a flux of about 7 mwatt/cm². This broke some of the dimers in a thin layer at the surface of the crystal. The uv beam from an He-Cd⁺ laser, at a wavelength of 0.325 $\mu$m, was split into two equal intensity beams with a beam splitter, and mirrors were used to direct the two beams so that they intersected at the surface of the crystal, each forming an angle of 20.2° with the normal to the crystal surface. This produced a fringe pattern in the crystal with a period of about 0.5 $\mu$m. A camera shutter was placed in the uv beam to control the exposure. The red beam from an He-Ne laser, at a wavelength of 0.633 nm, was directed at the back surface of the crystal, at an angle of about 42.25° from the normal to the surface. When the uv beams struck the crystal they caused redimerization of some of the broken dimers in a grating pattern. This resulted in a spatial modulation of the index of refraction for the red light which was scattered into a diffracted beam at an angle calculable from the grating equation. For the geometry used, the diffracted beam was at an angle of 42.25° from the normal to the crystal. After a uv exposure of about 20 seconds with a total average flux of about 3 mwatt/cm² a diffracted beam of red light was clearly visible on a screen, at the predicted position. Further exposure to the uv beams increased the intensity of the diffracted spot reaching a maximum at about 60 second exposure. Still further exposure slowly reduced the intensity of the diffracted light, and, after about 4 minutes total exposure, the diffracted beam was no longer visible. After a second irradiation with 0.248 $\mu$m light, the crystal was again exposed to the two 0.325 $\mu$m beams, and the diffracted red beam was again observed to increase and then decrease in intensity over a period of about 4 minutes. This cycle of erasing with 0.248 $\mu$m light and writing with 0.325 μm light was repeated several times. The sample was also erased by means of a 1 minutes exposure (at a distance of about 1 cm) to the light from a small low pressure Hg lamp. In this case, the erasing, or breaking of dimers, was done largely by light from the 0.2537 μm spectral line of Hg.

EXAMPLE 2

This example relates to an experiment conducted on a single crystal of a photodimer of acridizinium. Acridizinium salts were prepared according to the method of C. K. Bradsher and L. E. Beavers, *Journal of American Chemical Society*, 77, 4812 (1958). Pyridine-2-carboxaldehyde was reacted with benzyl bromide to give the quaternary salt. The crude material was cyclized by boiling with concentrated hydrobromic acid to give acridizinium bromide. The crystalline solid was converted to the photodimer by exposure to radiation from a 450 W medium pressure mercury lamp through a Pyrex filter. The photodimer bromide was converted to the p-toluenesulfonate salt by treatment with excess aqueous p-toluenesulfonic acid. The latter salt is more soluble and also could be grown as single crystals by evaporation of a solution of the salt in aqueous p-toluenesulfonic acid or acetic acid. Crystals grown in this manner were about 1–2 mm square and a few tenths of a millimeter thick.

The refractive index change between the dimer and monomer states in fluid solution was determined with an immersion refractometer. A solution of acridizinium p-toluenesulfonate (0.03 M) in dilute aqueous sulfuric acid was prepared and divided into two portions, kept in sealed vials. One of the samples was irradiated with 313 nm light for a few minutes to break the photodimer. From the near ultraviolet absorption spectrum, it was determined that the concentration of monomer was approximately $1.0 \times 10^{-2}$ M. Using the immersion refractometer, at 488 nm, it was found that the index of refraction of the irradiated sample was $3 \times 10^{-4}$ higher than that of the unirradiated sample. We define $n_o$ as the measured change in refractive index divided by the number of molecules of photodimer broken per ml. For the above solution $n_o \approx 10^{-22}$ cm$^{-3}$. A curve of the approximate change in refractive index throughout the visible was of the form shown in FIG. 1.

Refractive index gratings were repeatedly written and erased in an acridizinium p-toluenesulfonate photodimer crystal as described previously in Example 1 except that the light at 0.325 μm from the He-Cd$^+$ laser broke dimers in a grating pattern, and this grating was then erased by remaking the dimers with light at 0.365 μm, from the Xe-Hg arc lamp. The refractive index gratings were detected as in Example 1 except that light at 0.5145 μm from an Ar$^+$ laser was used. It was found that at 0.5145 μm the gratings typically scattered a few percent of the light; a scattering efficiency of 5 percent was observed.

EXAMPLE 3

In this example, a photodimer of acridizinium, as prepared in accordance with Example 2, was incorporated in a matrix. Acridizinium toluenesulfonate photodimer was incorporated into a clear hard copolymer of acrylic acid and methyl methacrylate. The photodimer (0.5 g.) was dissolved in purified acrylic acid (4 ml). After dilution with purified methyl methacrylate (46 ml) the catalyst (azoisobutyronitrile, 6 mg) was added, the solution was deaerated with a nitrogen stream, and the tube sealed. It was kept at about 45° C. until polymerization appeared to be complete (about 2 days) and the polymer was then hardened by heating at 120° C. for 2 hours. In some experiments, polymer properties were improved further by the addition of small amounts of a crosslinking agent such as ethylene glycol dimethacrylate. The polymer was cut into 2 mm thick pieces which were polished on both sides. The photolytic conversion of the photodimer to broken dimer was accomplished with 313 nm light, isolated from a mercury arc with a monochromator. The conversion was followed by observing the growth of the broken dimer absorption spectrum in the 350–400 nm region. Reversal to photodimer was caused by exposure to 365 nm light and was considered complete as judged by complete disappearance of the broken dimer absorption spectrum.

The refractive index change ($n_o$) for the photodimer held in a rigid matrix was somewhat smaller than that for the sample of Example 2 because of a small amount of hypochromism in the absorption spectrum of the broken dimer relative to two isolated monomers.

Experimental procedure similar to that conducted on the single crystal of Example 2 was performed on a sample of acridizinium p-toluenesulfonate photo-dimer in the acrylic acid-methyl methacrylate copolymer prepared as described above. A scattering efficiency of 0.03 percent was observed.

What is claimed is:

1. Optical element comprising a switchable medium in which a transmission characteristic for electromagnetic radiation of a first wavelength may be altered locally by selecting one of two thermally stable states, in which the selection is caused by irradiation with corresponding electromagnetic radiation of different second and third wavelengths, characterized in that the said transmission characteristic is refractive index and in that said switchable medium comprises a photodimer, in which the said bistable states correspond to different relative amounts of dimerized and broken dimer material, said relative amounts being alterable in opposite directions by said second and third wavelengths and in which the said photodimer is composed of two monomer units each possessed of a resonant electronic system consisting essentially of from one to six six-membered rings and in which the dimerization involves para-positioned carbon atoms other than fusion points between adjacent rings.

2. Element of claim 1 in which said variations are local and are produced by interference of at least two light beams of one of said different wavelengths.

3. Element of claim 2 in which said two beams are coherent and unmodulated.

4. Element of claim 3 in which at least one of the said beams is modulated.

5. Element of claim 4 in which said modulation is produced during reflection.

6. Element of claim 4 in which said modulation is produced during transmission.

7. Element of claim 1 in which said local variation corresponds to digital information.

8. Element of claim 1 in which the said local variation corresponds to analog information.

9. Element of claim 8 in which the said local variation is an interference pattern.

10. Element of claim 1 in which the medium is a photodimer of an anthracene derivative.

11. Element of claim 10 in which the said anthracene derivative is acridizinium.

12. Element of claim 1 in which the said photodimer is contained in a matrix.

13. Element of claim 12 in which the said matrix consists essentially of a copolymer of acrylic acid and methyl methacrylate.

14. Element of claim 1 in which the said switchable medium consists essentially of a single crystal.

* * * * *